July 11, 1961        R. E. BECKER        2,991,800

AIR VALVE

Filed Dec. 11, 1957

INVENTOR.
ROBERT E. BECKER,
BY
*Parker and Carter*
ATTORNEYS.

2,991,800
AIR VALVE

Robert E. Becker, Logansport, Ind., assignor to Logansport Machine Company, Logansport, Ind., a corporation of Indiana
Filed Dec. 11, 1957, Ser. No. 702,191
1 Claim. (Cl. 137—596.2)

My invention is concerned with three-way air pilot valves especially adapted for use in pressure systems in which an accurate, instantly responsive control throughout the system must be maintained.

Accordingly, a primary object of my invention is the provision of an instantly responsive three-way air pilot valve for use in relatively low pressure systems.

Another object is the provision of an air pilot valve adapted for use in pressure systems which will be instantly responsive to a small valve operating force.

A further object is the provision of a novel sealing arrangement in a three-way ball type air pilot valve whereby the exhaust conduit will be effectively sealed prior to displacement of the ball from its seat, and similarly a seal will be maintained subsequent to the replacement of the ball on its seat.

Another object is a ball valve which is rugged in construction, simple to manufacture and requires extremely small forces to operate.

Another object is the provision of a three-way air pilot valve in which an O-ring sealing element is adapted, in conjunction with a ball closure, to form a pair of seals to thereby prevent the escape of pressure from the interior of the valve during an operation of an actuating element.

Other objects will appear from time to time throughout the course of the specification and claim.

I illustrate my invention more or less diagrammatically in the accompanying drawings in which, FIGURE 1 is a sectional view through the valve showing the inlet port closed to the outlet port;

Like reference numerals indicate like parts throughout the several views.

Figure 1:
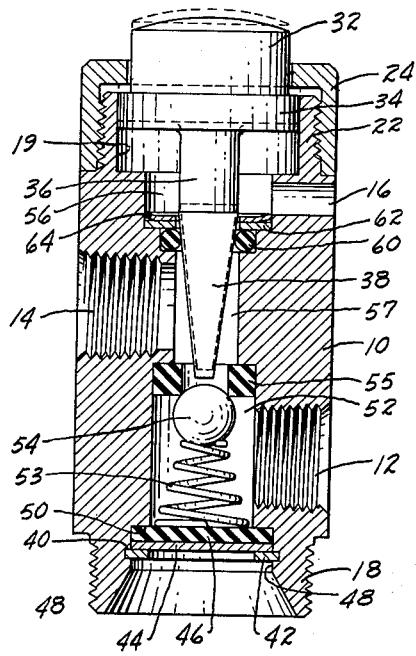
Figure 2:
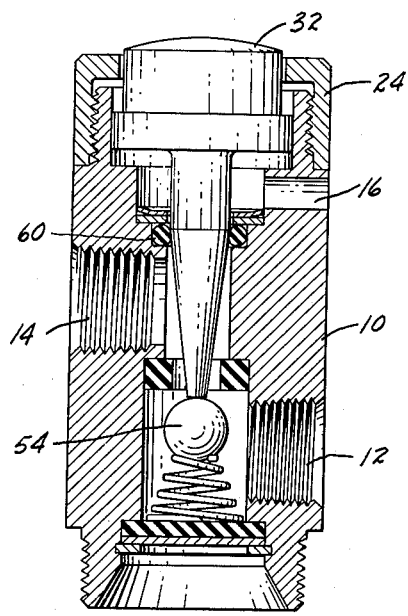
FIGURE 2 is a sectional view showing the inlet port in communication with the outlet port.

Referring specifically to FIGURES 1 and 2, 10 indicates the body of my valve and 12, 14 and 16 are respectively inlet, outlet and exhaust connections. The inlet and outlet ports are preferably threaded for attachment to pressure conduits. If the exhaust port does not vent directly to the atmosphere, it may also be threaded for engagement with a suitable conduit.

Figure 3:
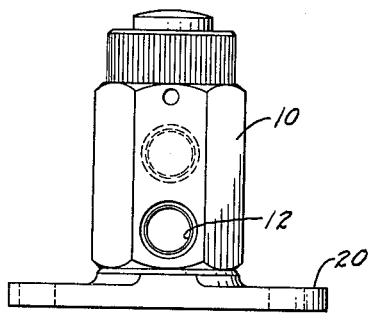
FIGURE 3 is an elevation of my valve on a reduced scale with a base mounting.
Figure 4:
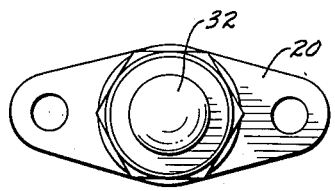
FIGURE 4 is a plan view of FIGURE 3.

At the bottom of the valve body I have shown an extension 18 which may be threaded for engagement with any suitable base mounting 20 as shown in FIGURES 3 and 4.

Extending upwardly from the top of the body is a similar extension 22 which may be externally threaded to receive a flange, base, or threaded mounting. As shown in FIGURE 1, a simple cap 24 or threaded mounting acts as a dust shield. An annular bore 19 is formed within the extension 22.

A plunger having an impact receiving head 32 and an annular guiding collar 34 is fitted within the bore 19. A downwardly extending stem is shown as composed of a constant diameter portion 36 and a tapered portion 38.

The lower extension 18 is provided with an internal bore 48 which forms an annular shoulder 50. The bore is relieved as at 40 to form an annular groove or support in which an expandable washer 42 is placed. The washer forms a support for the base 44 and impact receiving member 46.

The valve body 10 is formed with an internal cavity composed of three chambers extending substantially its entire length. Positioned in the lower chamber 52 are a spring 53, ball 54 and ring 55 which forms a seat for the ball. An upper chamber 56 opens into bore 19, and a middle chamber 57 of a reduced diameter joins the upper and lower chambers.

Middle chamber 57 and lower chamber 52 form, in effect, a single chamber connecting the inlet and exhaust ports.

The stem of the plunger extends through the bore 19, upper chamber 56, middle chamber 57 and into lower chamber 52. The middle chamber is relieved above the outlet port to form a shoulder for an O-ring seal 60. The O-ring is held in place by a flat washer 62 and a retainer washer 64.

The use, operation and function of my device is as follows.

In FIGURE 1 the valve is shown in solid lines in an inoperative, or shut off condition. The ball 54 is urged upwardly by the spring 53 into contact with its seat 55, thus shutting off communication between the inlet port 12 and the middle chamber 57. At the same time the plunger is in a position such that the tapered stem 38 has made contact with O-ring 60, thus sealing off communication between vent 16 and the middle chamber 57. This position of the ball and plunger is established when no back pressure through 14 is present or, if present, is so small as to be more than counter-balanced by the weight of the plunger.

In FIGURE 2 the chamber is shown in a live condition, that is, with fluid under pressure flowing through the valve along a path from the inlet port 12, into middle chamber 57, and out the outlet port 14. The vent 16 is meanwhile sealed from the path of the fluid.

When the plunger is depressed starting from the position shown in FIGURE 1, the O-ring 60 makes initial contact with the stem 38. The O-ring 60 remains in contact with the stem 38 and as the plunger descends the O-ring will be gradually compressed. The increasing compression of the O-ring makes a tighter and tighter seal until finally when the tip of the stem contacts the ball an extremely tight seal exists above the middle chamber. Continued downward movement of the plunger displaces the ball 54 from its seat 55 and permits pressure fluid to flow through the valve from right to left. The parts are then in the position shown in FIGURE 2.

When the plunger is released it will initially assume the position shown in solid lines in FIGURE 1. As exhaust or back pressure enters port 14, and flows toward the valve, it will flow into middle chamber 57 and elevate the plunger enough to break the seal between the O-ring 60 and the tapered stem 38. The fluid will then flow around the stem and out the exhaust vent 16. The plunger will then occupy the dotted line position of FIGURE 1.

The O-ring 60 is compressible and may be made of a rubber base material such as neoprene, which has a good resilient action and will withstand repeated compressions and extensions.

The taper of the stem is highly important. Thus, when the plunger is depressed the stem must be so proportioned that it will engage the O-ring 60 and form a seal before the tip strikes the ball. The taper is further important in that an operating force of only two to three pounds is all that is required to depress the plunger and open communication between the inlet and exhaust ports. That is, the effective area over which the fluid pressure acts in order to exert an upward thrust against the plunger is so reduced that only a very slight pressure is needed to actuate the valve in a system in which much larger pressures are used. This effective area is the area of the plunger circumscribed by the line of sealing contact with the O-ring minus the area of the tip end of the plunger in contact with the ball. The less the taper the less the effective area and the less the operating force required to depress the plunger against any given inlet pressure. In addition, the thinner the stem, the less the effective area.

The spring 53 exerts little resistance to the depression of the plunger, but merely serves as a means for maintaining the ball in position and returning it to the seat 55 between depressions of the plunger.

I contemplate that numerous changes may be made in the size, shape and disposition of parts without departing from the spirit of my invention. For example, a considerable variation may be made in the structural details of the supporting base for the spring and the means for holding the O-ring in place. Similarly, to obtain a more nearly perfect contact between the tip of the tapered stem and the ball, it would be necessary to machine the tip of the stem into a complementary surface with the exterior surface of the ball. This adds considerably to the cost of manufacturing, however.

The description above is intended to be of an illustrative nature only, and I do not wish to be limited except by the scope of the following appended claim.

I claim:

A pilot valve constructed and arranged for direct connection into a fluid pressure flow path, said pilot valve being operable to enable pressure fluid to flow along the path directly through the pilot valve at all times when the pilot valve is in an open condition and to shut off fluid flow along the path when the pilot valve is in a closed condition, said pilot valve including, in combination, a housing forming a chamber, an inlet port which opens into the chamber and is adapted for connection directly into a fluid pressure path, an outlet port which opens into the chamber and is adapted for connection directly into the fluid pressure path, a valve seat between the inlet and outlet ports, a valve on the inlet side of the valve seat, means for yieldably urging the valve into seating engagement on the valve seat, said valve being effective, when seated, to shut off fluid flow from the inlet port to the outlet port, an exhaust port communicating with the chamber on the outlet side of the valve seat, annular sealing means between the exhaust port and outlet port, and an externally acutuatable plunger in close proximity to the valve and in sealing engagement with the sealing means, said plunger being constructed for slidable movement axially of the sealing means, at least the initial portion of the plunger in contact with the sealing means being tapered to form a progressively tighter seal as the plunger moves toward the valve, means biasing said externally actuatable plunger into sealing engagement with the sealing means when the valve is seated and substantially no back pressure is present in the outlet port, said plunger being effective, in response to an externally applied force, to displace the valve from the valve seat to thereby immediately open the fluid flow path between the inlet and outlet ports whereby pressure fluid may flow directly through the pilot valve.

References Cited in the file of this patent
UNITED STATES PATENTS

| | | |
|---|---|---|
| 616,197 | Moller | Dec. 20, 1898 |
| 941,760 | Cordley | Nov. 30, 1909 |
| 1,444,188 | Key | Feb. 6, 1923 |
| 1,669,650 | Bloch | May 15, 1928 |
| 2,594,626 | Earle | Apr. 29, 1952 |
| 2,697,447 | Troy | Dec. 21, 1954 |